(12) United States Patent
Radhakrishnan et al.

(10) Patent No.: US 7,573,857 B1
(45) Date of Patent: Aug. 11, 2009

(54) CAPACITY MANAGEMENT FOR WIRELESS LOCAL AREA NETWORKS

(75) Inventors: Ramesh Radhakrishnan, Saratoga, CA (US); Ramanathan Balachander, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 462 days.

(21) Appl. No.: 11/036,973

(22) Filed: Jan. 14, 2005

Related U.S. Application Data

(60) Provisional application No. 60/537,236, filed on Jan. 16, 2004.

(51) Int. Cl.
*H04W 4/00* (2006.01)
*H04J 3/00* (2006.01)
(52) U.S. Cl. ....................... 370/338; 370/336
(58) Field of Classification Search ................. 370/229, 370/308, 310, 328, 331–332, 342–345, 336, 370/338
See application file for complete search history.

(56) References Cited

U.S. PATENT DOCUMENTS

| | | | | |
|---|---|---|---|---|
| 5,717,688 | A * | 2/1998 | Belanger et al. | 370/331 |
| 6,314,082 | B1 * | 11/2001 | Malmgren | 370/208 |
| 6,393,482 | B1 * | 5/2002 | Rai et al. | 709/225 |
| 6,522,881 | B1 * | 2/2003 | Feder et al. | 455/437 |
| 6,985,465 | B2 * | 1/2006 | Cervello et al. | 370/333 |
| 7,173,918 | B2 * | 2/2007 | Awater et al. | 370/332 |
| 7,222,175 | B2 * | 5/2007 | Knauerhase et al. | 709/225 |
| 2003/0139197 | A1 * | 7/2003 | Kostic et al. | 455/525 |
| 2003/0231610 | A1 | 12/2003 | Haddad | |
| 2004/0001467 | A1 * | 1/2004 | Cromer et al. | 370/338 |
| 2004/0039817 | A1 * | 2/2004 | Lee et al. | 709/225 |
| 2004/0047323 | A1 * | 3/2004 | Park et al. | 370/338 |
| 2004/0165548 | A1 * | 8/2004 | Backes | 370/328 |
| 2004/0223476 | A1 * | 11/2004 | Jose et al. | 370/338 |
| 2004/0267928 | A1 | 12/2004 | Petrus | |
| 2005/0071476 | A1 * | 3/2005 | Tejaswini et al. | 709/227 |
| 2005/0090250 | A1 | 4/2005 | Backes | |
| 2005/0124335 | A1 | 6/2005 | Cave et al. | |
| 2005/0153702 | A1 | 7/2005 | Cuffaro et al. | |

OTHER PUBLICATIONS

Final OA Dated Jul. 17, 2008, for U.S. Appl. No. 11/035,753, 25 pages.
OA Dated Jan. 7, 2009 for U.S. Appl. No. 11/035,753, 23 pages.

* cited by examiner

*Primary Examiner*—Lester Kincaid
*Assistant Examiner*—Nathan Mitchell
(74) *Attorney, Agent, or Firm*—Turocy & Watson, LLP

(57) ABSTRACT

Methods and systems are presented for establishing communications in a wireless local area network involving obtaining at least one measurement of load for each of a plurality of access point (AP) devices, automatically selecting one of the plurality of AP devices as a selected AP device by taking into account the at least one measurement of load for each of the plurality of AP devices, and associating a station (STA) device with the selected AP device, wherein the selected AP device and the STA device are capable of communicating data within a wireless local area network. Also, at least one measurement of signal strength as measured at the STA device for each of the plurality of AP devices may be obtained, and automatic selection of one of the plurality of AP devices may further take into account the at least one measurement of signal strength for each AP device.

23 Claims, 7 Drawing Sheets

Hot Spot
(N Hours)

Hot Spot
(N+ 2 Hours)

CAPACITY MANAGEMENT FOR WIRELESS LOCAL AREA NETWORKS

CROSS-REFERENCES TO RELATED APPLICATIONS

This application claims priority from U.S. Provisional Application No. 60/537,236; filed Jan. 16, 2004. The 60/537,236 application is incorporated herein by reference.

BACKGROUND OF THE INVENTION

As use of wireless local area networks (WLANs) increases, frequency channels over which wireless communications take place to support WLANs have become more and more overcrowded. A typical WLAN may involve one or more access point (AP) devices connected to a network and one or more client station (STA) devices connected to the network through an AP device. FIG. 1 depicts an illustrative wireless network 100. Wireless network 100 includes an AP device 102 communicating wirelessly with STA devices 104 and 106. Typically, wireless networks may include numerous AP devices and STA devices, but the simplified wireless network 100 is shown in here for illustrative purposes. AP device 102 is shown to be connected to a wired network 108 that may be connected to other networks. Wireless network 100 operates by allowing STA devices 104 and 106 to access such other networks via AP device 102. A wireless network such as wireless network 100 may form a WLAN or a part of a WLAN.

In wireless network 100, AP device 102 communicates wirelessly with STA devices 104 and 106 using a particular frequency channel. This communication is possible as long as STA devices 104 and 106 stay within a certain radio signal range of AP device 102. The range defines a cell for AP device 102. There may exist other AP devices in wireless network 100 having their own respective cells, which can overlap with the cell of AP device 102. In its cell, another AP device may communicate with STA devices using a frequency channel that possibly overlaps the frequency channel used by AP device 102. In fact, two AP devices may use the exact same frequency channel. This may not cause any problems if the two AP devices operate in respective cells that are physically separated from one another. In that case, even if they utilize the same frequency channel, the AP devices may not interfere with one another because they are beyond each other's radio signal range. However, if two AP devices operate in respective cells that overlap or are close in proximity, interference is likely to occur.

With the use of WLANs becoming increasingly widespread, more and more AP devices are being deployed in closer proximity to one another. This significantly increases the likelihood of interference caused by neighboring AP devices operating on the same or similar frequency channels. Such interference can dramatically reduce the performance of WLAN networks by degrading the communication of data amongst affected AP devices and STA devices. Furthermore, the load of a wireless network can often be unevenly distributed. At any point in time, certain AP devices may be heavily loaded with communication of data with numerous STA devices, while other AP devices may be not be heavily loaded at all. Uneven distribution of load accentuates these and other performance degradations in a wireless network system.

Thus, there is an urgent need for improved techniques for wireless communications in increasingly crowded wireless network environments.

BRIEF SUMMARY OF THE INVENTION

The present invention relates to methods and systems for establishing communications in a wireless local area network involving obtaining at least one measurement of load for each of a plurality of access point (AP) devices, automatically selecting one of the plurality of AP devices as a selected AP device by taking into account the at least one measurement of load for each of the plurality of AP devices, and associating a station (STA) device with the selected AP device, wherein the selected AP device and the STA device are capable of communicating data within a wireless local area network.

The at least one measurement of load for each AP device may comprise a count of STA devices associated with the AP device. The at least one measurement of load for each AP device may comprise a measurement of percentage of time during which the AP device is communicating data. Also, at least one measurement of signal strength as measured at the STA device for each of the plurality of AP devices may be obtained, and automatic selection of one of the plurality of AP devices may further take into account the at least one measurement of signal strength for each AP device. The at least one measurement of signal strength may be based on a received signal strength indicator (RSSI) measurement. The at least one measurement of signal strength may be based on a signal-to-interference ration (SIR) measurement.

Automatic selection of one of the plurality of AP devices may be performed by the STA device, one of the plurality of AP devices, or a central entity. Automatic selection of one of the plurality of AP devices may be triggered before the STA device is associated with any of the plurality of AP devices. Also, automatic selection of one of the plurality of AP devices may be triggered periodically to newly select an AP device, and the STA device may be associated with the newly selected AP device.

The plurality of AP devices may comprise a first AP device included in a first physical module and a second AP device included in a second physical module, wherein one of the first AP device and second AP device is selected as the selected AP device. The plurality of AP devices may comprise a first AP device and a second AP device included in a common physical module, wherein one of the first AP device and second AP device is selected as the selected AP device. In one embodiment, a second AP device is selected as the selected AP device if load of a first AP device sufficiently exceeds load of the second AP device. Load of the first AP device may be deemed to sufficiently exceed load of the second AP device if a count of STA devices associated with the first AP device exceeds a count of STA devices associated with the second AP by a specified margin. Load of the first AP device may be deemed to sufficiently exceed load of the second AP device if a measurement of percentage of time during which the first AP device is communicating data exceeds a measurement of percentage of time during which the second AP device is communicating data by a specified margin.

DETAILED DESCRIPTION OF THE INVENTION

I. Dynamic Frequency Selection

Figure 1:
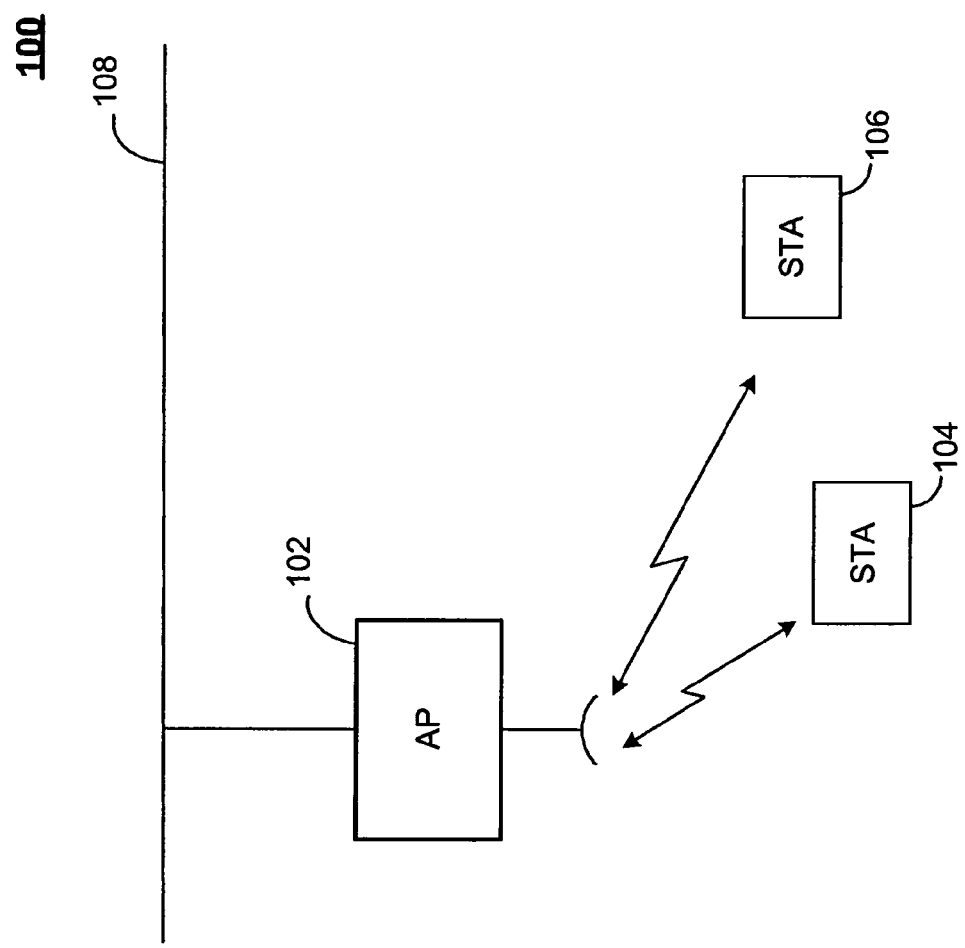
FIG. 1 depicts an illustrative wireless network 100.
Figure 2:
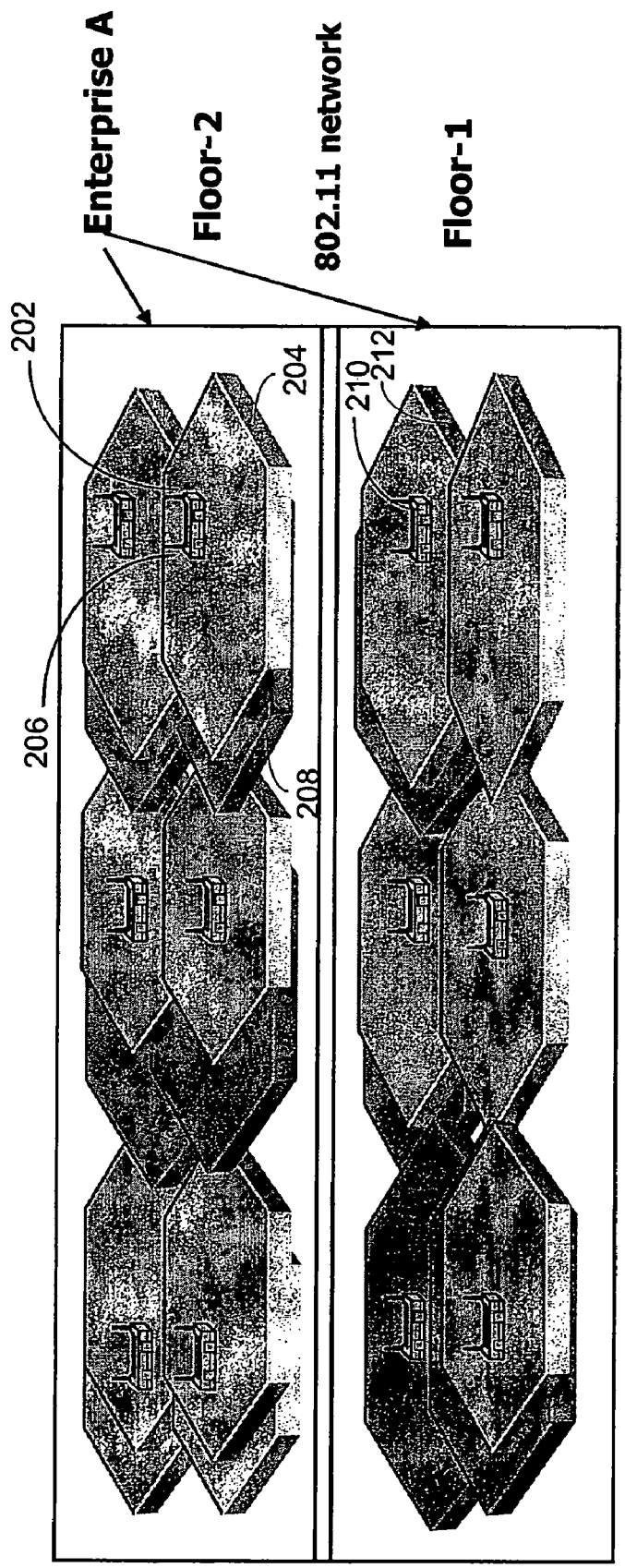
FIG. 2 depicts an illustrative scenario of planned wireless network development and growth.

FIG. 2 depicts an illustrative scenario of planned wireless network development and growth. Here, a single tenant referred to as Enterprise A occupies multiple floors of an office building. On each floor, multiple AP devices may be deployed to implement one or more wireless local area networks. Here, an AP device refers broadly to a device that is capable providing network access to one or more station (STA) devices in a wireless local area network. An AP device may be implemented using a combination of hardware and/or software. AP devices are not necessarily restricted to one or more physical modules. For example, there may be multiple AP devices contained in a single physical module. As it is known in the art, a physical module commonly referred to as an "access point" may actually include two or more separate radio communication units, each capable of communicating on a different radio frequency channel. It should be understood that an AP devices as presently described may comprise such a radio communication unit.

As shown in FIG. 2, the AP devices of the two floors form a single 802.11 wireless local area network. Each AP device may have its own corresponding cell. For example, an AP device 202 having a corresponding cell 204 is deployed on the second floor. AP device 202 may be included in a common physical module as another AP device 206, which has a corresponding cell 208. Even though the physical module in this case houses two separate AP devices 202 and 206, the module may sometimes be referred to as an AP. As shown in FIG. 2, different AP devices may be deployed in close proximity to one another. Thus, AP devices on the same floor or on different floors have the potential of interfering with one another. For example, a AP device 210 deployed on the first floor and having a corresponding cell 212 may interfere with AP device 202.

Such interference may be avoided by Enterprise A through careful planning of the wireless network environment. Enterprise A may configure AP devices that are deployed in close proximity to one another such that they operate on separate frequency channels to avoid interference, even for AP devices deployed on different floors. For instance, Enterprise A may configure AP device 202 to operate on one frequency channel, and AP device 210 to operate on another frequency channel, such that they do not interfere with one another. However, planning of the wireless network environment is not always feasible, as described in more detail below.

Figure 3:
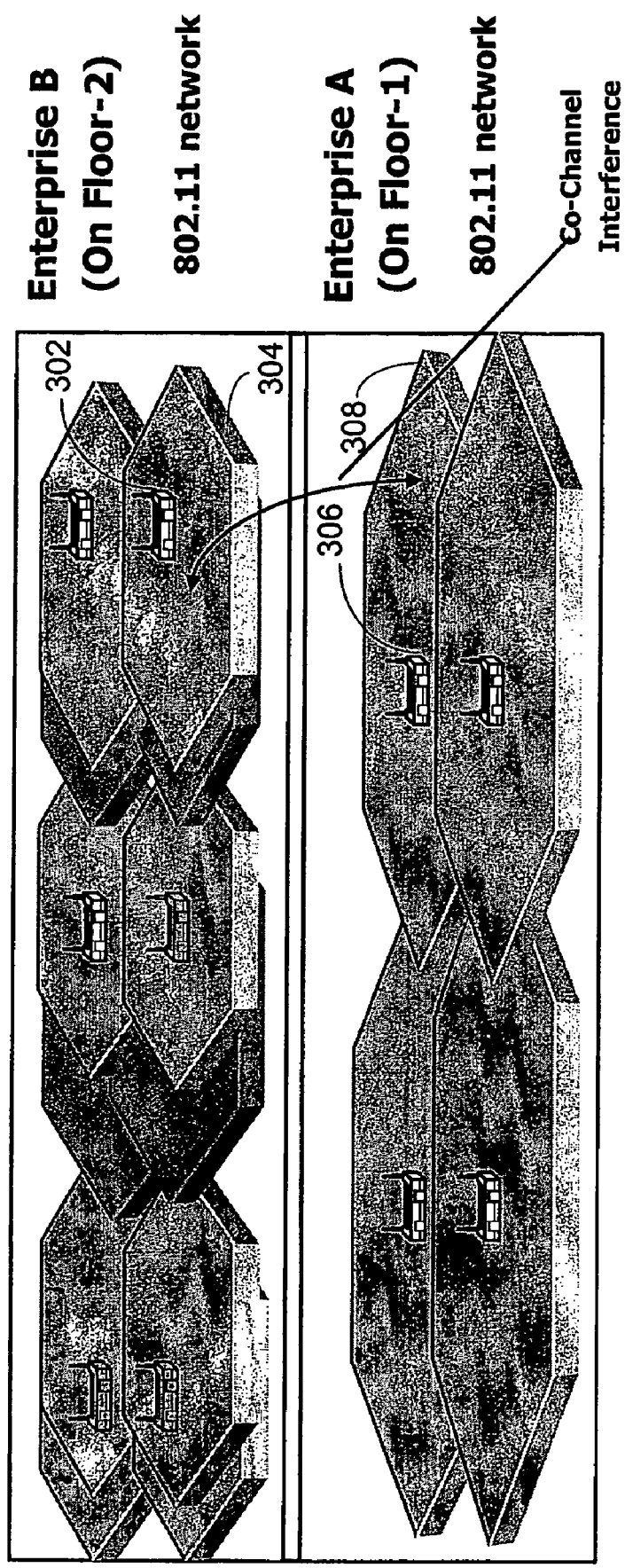
FIG. 3 depicts an illustrative scenario of limited planning or unplanned wireless network development and growth.

FIG. 3 depicts an illustrative scenario of limited planning or unplanned wireless network development and growth. Here, multiple tenants referred to as Enterprise A and Enterprise B occupy floors one and two, respectively, of an office building. On each floor, multiple AP devices each with a corresponding cell may be deployed to implement one or more wireless local area networks. As shown, the AP devices of each floor form a separate 802.11 wireless local area network. In this case, planning of the wireless network environment may not be feasible. Enterprise A and Enterprise B may be independent entities, such as separate corporations, that have no interaction with one another. In fact, coordinated deployment of AP devices across the two floors may be impossible or even undesirable, given concerns such as network privacy and security.

Thus, AP devices deployed on the first and second floors may interfere with one another, if they happen to operate on the same or closely located frequency channels. For example, an AP device 302 on the second floor and having a corresponding cell 304 may interfere with an AP device 306 on the first floor and having a corresponding cell 308. This may occur, for instance, if Enterprise A configures AP device 306 to operate on a particular frequency channel, and Enterprise B happens to configure AP device 302 to operate on the same frequency channel. Without coordination between Enterprise A and Enterprise B on the deployment of their AP devices, such co-channel interference may occur, especially as wireless networks become more commonly used.

Figure 4:
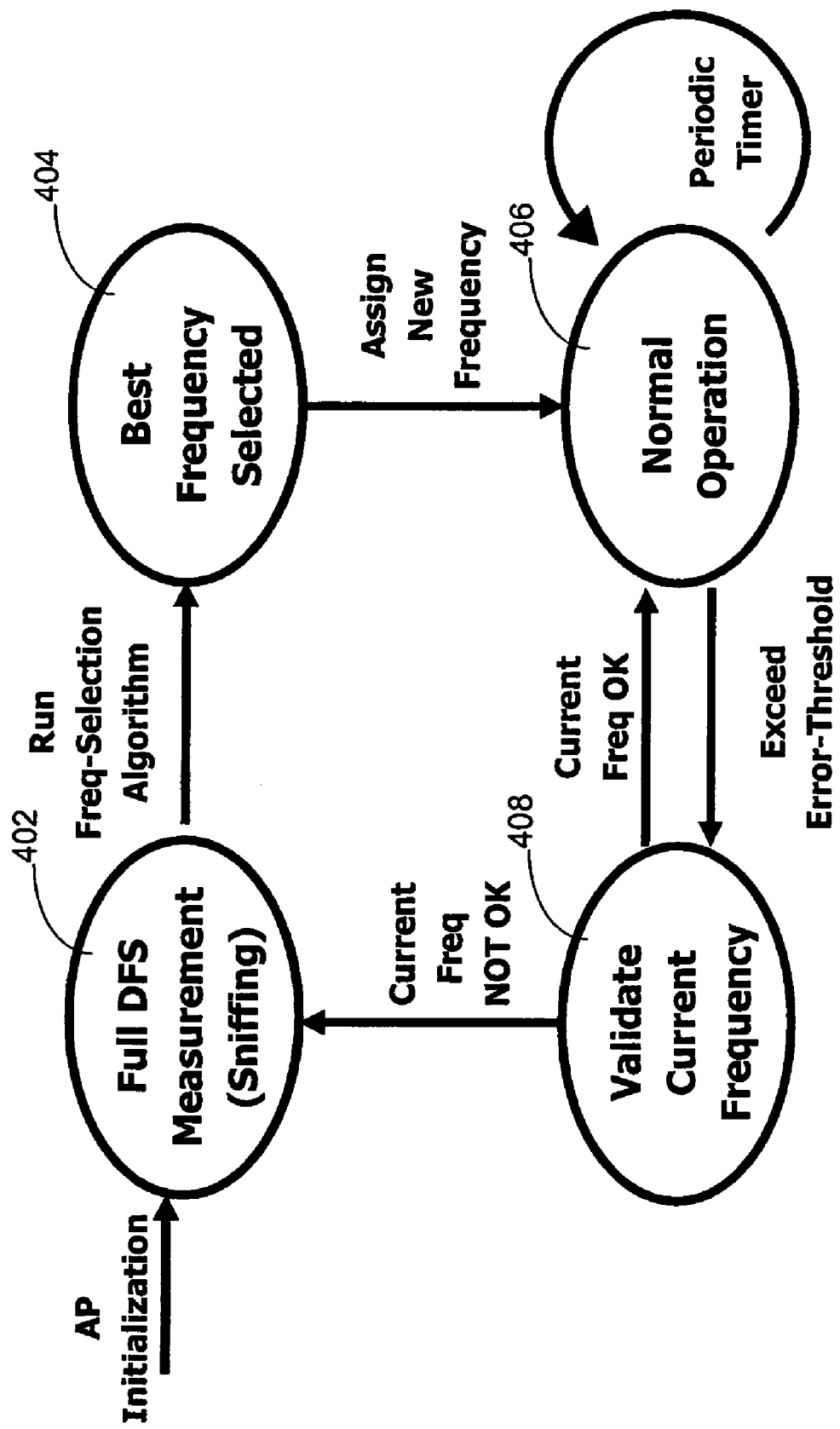
FIG. 4 is a state diagram of a process for allowing an AP device to dynamically select a frequency channel in accordance with one embodiment of the present invention.

FIG. 4 is a state diagram of a process for allowing an AP device to dynamically select a frequency channel in accordance with one embodiment of the present invention. Instead of being fixed to a particular frequency channel, the AP device may dynamically select a particular frequency channel on which to operate. This dynamic frequency channel selection may take place during initialization of a wireless network, during expansion of the wireless network, or during normal operation.

In a state 402, at least one channel-specific measurement is obtained for each of a plurality of frequency channels. State 402 may be entered, for instance, upon initialization of a wireless network. As shown in the figure, the one or more measurements obtained at state 402 may be referred to as a full dynamic frequency selection (DFS) measurement, or "sniffing." Generally speaking, the available frequency spectrum is evaluated to provide information for facilitating the selection of a particular frequency channel.

Different types of measurements may be obtained for each frequency channel. For example, different measurements relating to signal strength may be obtained. One such measurement may be a received signal strength indicator (RSSI) measurement taken of a frequency channel by the AP device. The RSSI measurement may provide a general measure of signal strength present on the particular channel. Another measurement related to signal strength may be a signal-to-interferer ratio (SIR) measurement taken on the frequency channel by the AP device. The SIR measurement may provide an indication of the relative strength of a desired signal compared to that of interference present on the frequency channel. One or more of such different types of measurements may be used in selecting an appropriate frequency channel on which the AP device is to operate.

According to one embodiment of the invention, a measurement related to signal strength may be obtained generally for a frequency channel. For example, an AP device may tune to a particular frequency channel and make a measurement of signal strength on that frequency channel. Alternatively or additionally, such a measurement may be obtained with respect to a particular signal source in the frequency channel. For example, an original AP device may send a probe request on a frequency channel, directed at other AP devices operating in the vicinity. Any AP device that receive the probe request may then respond by sending a probe response on the frequency channel. There could be multiple AP devices that send such probe responses. The original AP device can thus measure the RSSI value of each probe response while receiving the probe response. This provides a more detailed measurement of signals present on the frequency channel.

Furthermore, STA devices associated with an AP device may also make measurements related to signal strength on the frequency channel. Such STA devices may then communicate the measurements to the AP device. The AP device may use measurements it obtains on its own and/or measurements obtained by STA devices in selecting a frequency channel.

A state 404 may follow state 402. In state 404, a particular frequency channel is selected, taking into account the measurements obtained in state 402. In the present embodiment, the frequency channel having the least amount of signal occupancy may be chosen as the selected frequency channel. There may be various ways in which the obtained measurements may be utilized in making the frequency selection. In one example, the frequency channel having the lowest RSSI measurements and/or highest SIR ratios is selected. Different combinations of such measurements may also be utilized to select a frequency channel in accordance with the invention.

A state 406 may follow state 404. In state 406, AP device conducts normal operations using the selected frequency channel. This may include communication of data on the selected frequency channel with different STA devices associated with the AP device. During such operations, a predetermined condition may be periodically monitored to decide if the AP device needs to exit state 406 to possibly select a new frequency channel. The rate at which the predetermined condition is checked may be varied depending on the implementation and environmental factors. In one example, the predetermined condition is checked once every ten minutes.

The predetermined condition may be based on different types of information. In one embodiment, one or more packet error rates (PER) may be used to define the condition. Such PER values may be measured by the AP device or one or more of the STA devices communicating with the AP device on the current frequency channel. If multiple PER values are measured, a composite PER value may be calculated and used in as a single PER value when evaluating the condition. For example, if the PER value exceeds 1%, the AP device may exit state 404 and proceed to state 406. In another embodiment, one or more signal strength measurements may be used to define the condition. For example, if an SIR value measured at the AP device exceeds a maximum threshold, the AP device may exit state 404 and proceed to state 406. In other embodiments, another factor or a combination of factors may be used to define the predetermined condition.

A state 408 may follow state 406. In state 408, the AP device may determine whether the current frequency channel it is using is suitable for continued operation. Such an determination may involve evaluating various measurements discussed previously. For example, if an SIR measurement on the channel is found to be below a particular value, the process may exit state 408 and proceed to state 402. Otherwise, the process may return to state 406. In this manner, state 408 provides a secondary verification before the AP device proceeds to select a new frequency channel. In an alternative embodiment of the present invention, step 408 may be skipped, and the process may proceed immediately to state 402 upon exiting state 406.

A. Use of Thresholds on Measurements

In one embodiment of the invention, various thresholds defined with respect to measurements may be used in the frequency selection process employed in state 404 of FIG. 4. Use of thresholds on RSSI measurements are described below for illustrative purposes. It should be understood that thresholds may also be implemented with respect to other types of measurements. According to the present embodiment, a maximum RSSI threshold may be defined as a carrier sense threshold. Typically, a device that receives a signal having a signal strength above the carrier sense threshold on a particular channel would determine that the channel is already occupied and thus would defer to the existing signal and not transmit its own signal. According to the present embodiment, a minimum RSSI threshold may be defined as a carrier detection threshold. Typically, a device that receives a signal having a signals strength below the carrier detection threshold on a channel would determine that the signal is not strong enough to be properly received and thus would ignore the signal. Carrier sense and carrier detection thresholds may be set at different values for an AP device depending on the deployment environment. For example, factors such as open space versus divided rooms and dense versus sparse layout can affect these settings, as is known in the art.

Thresholds such as a maximum and minimum RSSI thresholds may be used to efficiently conduct dynamic frequency selection. For instance, an AP device detecting a signal strength on a particular channel that exceeds the maximum RSSI threshold may remove that frequency channel from a list of possible channels to select. Instead, the AP device may select from frequency channels that do not have measurements exceeding the maximum RSSI value. Such a procedure may allow the AP device to reduce the number of candidate channels and thereby more efficiently select a particular channel.

In this example, a situation could arise in which all of the available frequency channels have signal strength measurements that exceed the maximum RSSI threshold. In such a case, according to the present embodiment of the invention, the AP device may reset the maximum RSSI value to a higher value to proceed with the channel selection process. If again all available frequency channels have signal strength measurements that exceed the maximum RSSI threshold, the threshold may be raised again. If after multiple iterations it is determined that that continuing to increase the threshold does lead to proper selection of a suitable frequency channel, the AP device may select a default frequency channel or a frequency channel on which it is presently communicating data.

B. Load Based Dynamic Frequency Selection

According to one embodiment of the present invention, the at least one channel-specific measurement obtained in state 402 shown in FIG. 4 may comprise a measurement of data load on the frequency channel. Often, a frequency channel that is a candidate in the channel selection process may already be occupied by devices communicating data. The amount of communication taking place, or load, on such a channel may inform the channel selection process. Generally speaking, it may be advantageous to avoid a channel that is already heavily loaded and instead choose a less heavily loaded channel.

Figure 5A:
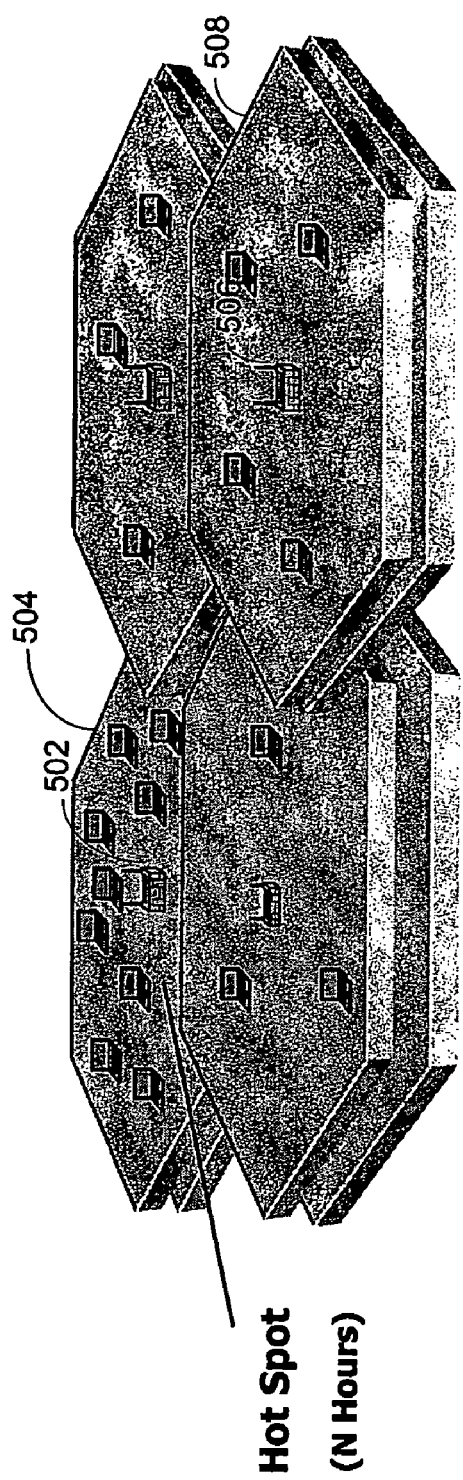
FIG. 5A shows a wireless network as it exists at a particular time referred to as "N hours"
Figure 5B:
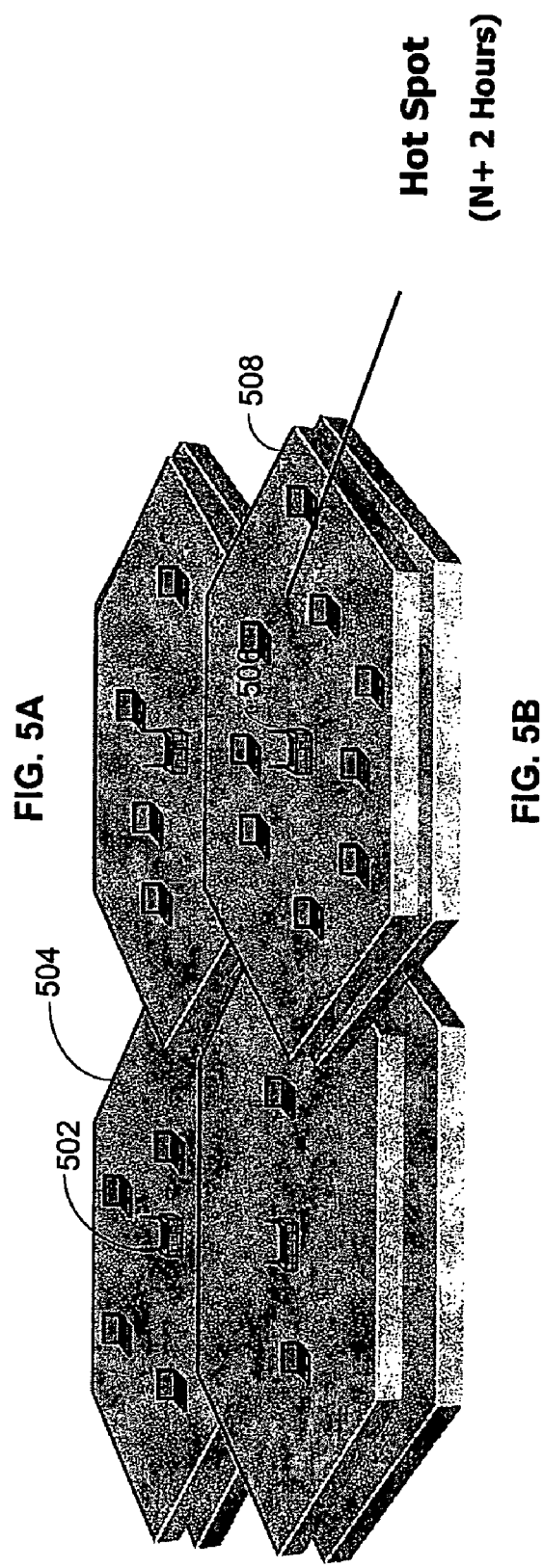
FIG. 5B shows the same wireless network as it exists at a later time referred to as "N+2 hours"

FIGS. 5A and 5B illustrate what may be referred to as a "dynamic hotspot problem." FIG. 5A shows a wireless network as it exists at a particular time referred to as "N hours." As shown, the wireless network comprises a number of AP devices and corresponding cells. These include AP device 502 and its corresponding cell 504, as well as AP device 506 and its corresponding cell 508. At "N hours," there exists a concentration of STA devices in cell 504. This general location is thus referred to as the current hot spot in the wireless network. FIG. 5B shows the same wireless network as it exists at a later time referred to as "N+2 hours." The wireless network still includes the same AP devices and corresponding cells. However, at "N+2 hours," there is no longer a concentration of STA devices in cell 504. Now, it is cell 508 that is crowded with a concentration of STA devices and has become the current hot spot.

As shown in FIGS. 5A and 5B, the load condition of a particular channel on which an AP is operating may change significantly with time. In this example, load may be measured in terms of the number of STA devices communicating with an AP device on a particular frequency channel. For instance, at "N hours," the frequency channel on which AP device 502 is operating is heavily loaded. However, at "N+2 hours," the same frequency channel on which AP device 502 is operating is no longer heavily loaded. Generally speaking, the more heavily loaded a frequency channel, the less capable it can be in taking on additional signal transmissions.

In one embodiment of the invention, the frequency selection process takes into account not only signal strength measurements such as RSSI and SIR, but also the load of neighboring AP devices using the same frequency channel. Thus, in a hotspot situation where a particular AP device is experiencing significantly high loads, neighbor AP devices may avoid the frequency channel used by the heavily loaded AP device. The load of a frequency channel may be used in choosing a new frequency channel and/or in triggering a frequency selection process. Use of load of a frequency channel in the frequency selection process promotes even distribution of load across available frequency channels. This improves performance by decreasing degradation caused by interference and increasing system throughput.

C. Channel Quality Factor

According to one embodiment of the invention, a combination of signal strength measurements and data load measurements are used in the frequency channel selection process. For example, a composite factor referred to here as a "channel quality factor" may be computed for each candidate frequency channel. The frequency channel having the best "channel quality factor" is then chosen in the frequency channel selection process.

The channel quality factor may be defined as follows. The contribution ($CQ_{f1,AP1}$) of a particular AP device (AP1) to the channel quality factor on a particular frequency channel (f1) is defined according to the equation:

$$CQ_{f1,AP1} = \text{Proximity Factor} \cdot \text{Load Factor}$$

The proximity factor may range from 0% to 100% and may be based on a signal strength measurement such as an RSSI measurement obtained with respect to a particular AP device. Such an RSSI measurement may be obtained by measuring probe response signal from the particular AP device, as mentioned previously. For instance, the proximity factor may be defined based on the RSSI measurement as follows. The proximity factor is defined at 100% if the RSSI value is greater than or equal to the carrier sense threshold. The proximity factor is reduced by 10 percent for every 1 dbm the RSSI value falls below the carrier sense threshold. The proximity factor reaches 0% when the RSSI value falls 10 dbm below the carrier sense threshold. An AP device collecting measurements in order to select a frequency channel may measure RSSI values associated with neighboring AP devices by sending a probe request signal. The AP device may then receive and measure the probe response signal sent from each neighboring AP device.

The load factor may be expressed as a percentage (%) of total time that a particular AP device spends in communicating data. This may be the aggregate time of burst periods, expressed as a percentage (%) of total time. The load factor of an AP may be averaged over a specified duration, such as 30 minutes. An AP device collecting measurements in order to select a frequency channel may receive reports of load factors from neighboring AP devices. Such a report may be received periodically over a protocol such as an inter-access point protocol (IAPP). Alternatively, the report may be received as part of a probe response, which is mentioned previously. The channel quality of a particular frequency channel ($CQ_{f1}$) may be determined by combining the contributions of AP devices operating on the frequency channel, according the equation:

$$CQ_{f1} = CQ_{f1,AP1} + CQ_{f1,AP2} + CQ_{f1,AP3} \ldots$$

In other words, the channel quality of a frequency channel f1 may be the weighted sum of all individual load factors for frequency channel f1, weighted according to their respective proximity factors. This channel quality factor may then be computed for each candidate frequency channel. Finally, the frequency channel having the lowest value for its channel quality factor may be selected in the frequency channel selection process.

D. Triggers for Dynamic Frequency Selection

Referring back to FIG. 4, dynamic frequency channel selection as depicted in this figure may take place during initialization of a wireless network, during expansion of the wireless network, or during normal operation. Initialization of a wireless network may occur upon initial deployment or upon network recovery after some sort of failure. An AP device deployed in a wireless network may perform dynamic frequency channel selection during initialization of the wireless network, as shown at state 402. Expansion of the wireless network may involve the addition of a new AP device into the network. Such a new AP device may perform dynamic frequency channel selection as it is being brought into the wireless network. Further, an AP device already operating in a wireless network may proceed toward a process of dynamic frequency channel selection upon detection of some predetermined condition, as shown in state 406.

Although an AP device may carry out the process illustrated in FIG. 4 for automatically selecting a frequency channel, various entities may trigger such a process. According to one embodiment, an AP device itself may trigger the process of frequency selection. For example, the AP device operating in state 406 in FIG. 4 may detect a predetermined condition and proceed toward other states for selecting a new frequency channel.

According to another embodiment, a central entity may trigger the frequency selection process. The central entity may gather information relating to data load as reported from a number of AP devices. Just as an example, each AP device may inform the central entity whenever its data load surpasses a particular threshold, such as 75%. Having received this information, the central entity may trigger neighboring AP devices operating in the same frequency to perform dynamic frequency selection and choose a better frequency if possible. In this manner, the central entity can coordinate the triggering of dynamic frequency selection by multiple AP devices operating close to one another and on the same frequency channel. This coordination may help to avoid race conditions in which numerous AP devices all proceed at the same time to select new frequency channels on which to operate.

Furthermore, the frequency selection process may be triggered based on different types of measurements. For example, the process may be triggered based on measurements of packet error rate (PER), RSSI, SIR, and/or data load, as mentioned previously.

E. Enhanced Implementation of Dynamic Frequency Selection

According to one specific embodiment of the invention, dynamic frequency channel selection takes into account a measure of number of AP devices operating on each available frequency channel. The frequency channel having the least number of AP devices operating thereon may be selected. If more than one frequency channel satisfy this criterion, then additional factors may be considered to select one frequency channel.

Figure 6:
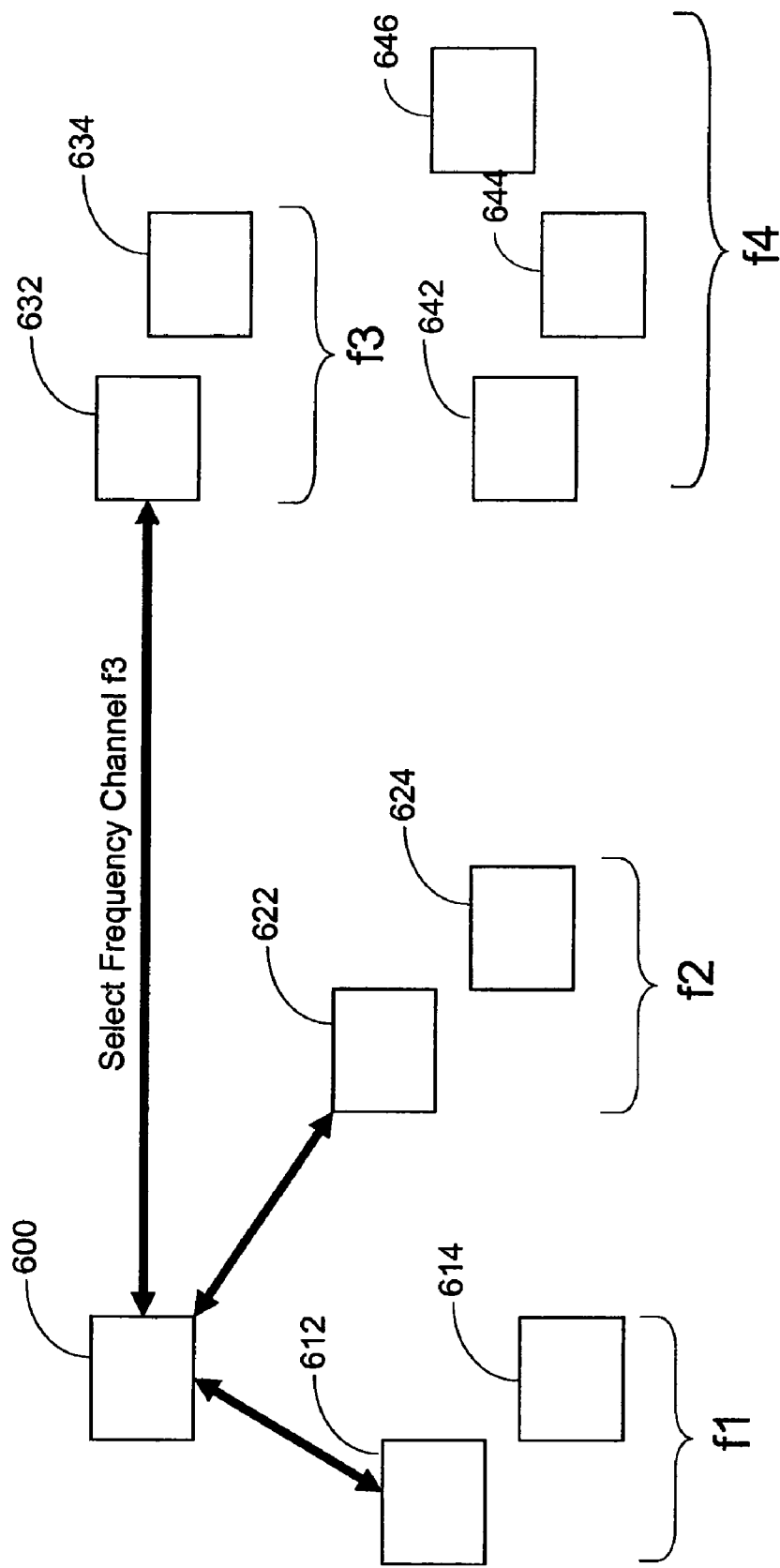
FIG. 6 illustrates the selection of a frequency channel from four possible frequency channels.

FIG. 6 illustrates the selection of a frequency channel from four possible frequency channels. Here, an AP device 600 is in the process of selecting a frequency channel on which it is to operate. The four frequency channels available are referred to as f1, f2, f3, and f4. Two AP devices 612 and 612 are operating on frequency channel f1. Two AP devices 622 and 622 are operating on frequency channel f2. Two AP devices 632 and 632 are operating on frequency channel f3. Three AP devices 642 and 642 are operating on frequency channel f4. FIG. 6 also depicts the proximity of these AP devices in relation to AP device 600.

First, AP device 600 determines if a particular frequency channel has the fewest number of AP devices operating on it. If so, that channel is selected as the frequency channel on which AP device 600 will operate. Here, the fewest number of AP devices operating on any frequency channel is two. However, three different frequency channels, f1, f2, and f3, satisfy this criterion. Thus, the selection of a frequency channel is not complete at this point. Instead, f1, f2 and f3 are identified as least populated frequency channels, and one of these channels will be chosen as the selected channel. Frequency channel f4 is not a least populated channel and is no longer considered a candidate.

One of the least populated frequency channels is selected such that the closest AP device operating on the selected frequency channel is farther than the closest AP device operating on any other least populated frequency channel. For example, for each of the least populated frequency channels f1, f2, and f3, the AP device on the channel that is closest in proximity to AP device 600 is identified. On frequency channel f1, the closest device is AP device 612. On frequency channel f2, the closest device is AP device 622. On frequency channel f3, the closest device is AP device 632. Now, it is determined which of the closest devices 612, 622, and 632 is farthest away from AP device 600. As shown in FIG. 6, AP device 632 is farthest away. Thus, frequency channel f3 is chosen as the selected frequency channel on which AP device 600 is to operate.

There may be various ways to measure the proximity of various AP devices to AP device 600. For example, the proximity factor based on a measure of signal strength, as described previously, may be used. Other measures indicating proximity of devices may also be used.

F. AP-STA Communication

Various messages may be passed between AP devices and STA devices to facilitate the process of dynamic frequency selection. For example, an AP device that requests a report of measurement information from an STA device may send a measurement request to the STA device. Such a request may specify a channel list identifying channels on which to make measurements, a time by which to complete a measurement, and/or other data. As another example, an STA device may respond by sending a measurement response to the AP device. Such a response may specify a measured RSSI value for each frequency channel requested, for instance. As a further example, an AP device that has selected a new frequency channel on which to operate may inform its associated STA devices, so that they can also transition to operation on the new frequency channel. Such a message may be sent as a beacon from the AP device to numerous STA devices. According to one embodiment of the invention, these and other messages passed between AP devices and STA devices may be implemented using messages defined in an 802.11(h) protocol. Variations on such a protocol or other protocols may also be used.

In certain situations, a portion of the STA devices associated with an AP device may not have sufficient capability to dynamically transition to a newly selected frequency channel. According to one embodiment of the present invention, in such a case, a common physical module including two separate AP devices may be used to partition the STA devices into two groups: one group capable of dynamically transitioning to a new frequency, and one group not capable of doing the same. One AP device in the physical module may be then be associated with STA devices in the first group. This AP device may proceed with dynamic frequency selection, communicating with its STA devices on dynamically selected frequency channels. The other AP device in the physical module may then be associated with STA devices in the second group. This other AP device may operate on a static, pre-selected frequency channel with its STA devices. In this manner, dynamic frequency selection may be implemented to flexibly accommodate differently capable STA devices.

II. Load Balancing

In one embodiment of the present invention, improved load distribution in a wireless network may be achieved by selecting the AP device with which an STA device associates, taking into account load information. If there exist a number of AP devices with which an STA device can associate, an AP device having a relatively light load may be selected. The load of a particular AP device may be measured in different ways, as discussed in later sections. For example, the number of STA devices already associated with the AP device, the amount of channel utilization such as percentage of time the AP device is communicating data, and/or a combination of these and other factors may be used in measuring load.

Figure 7:
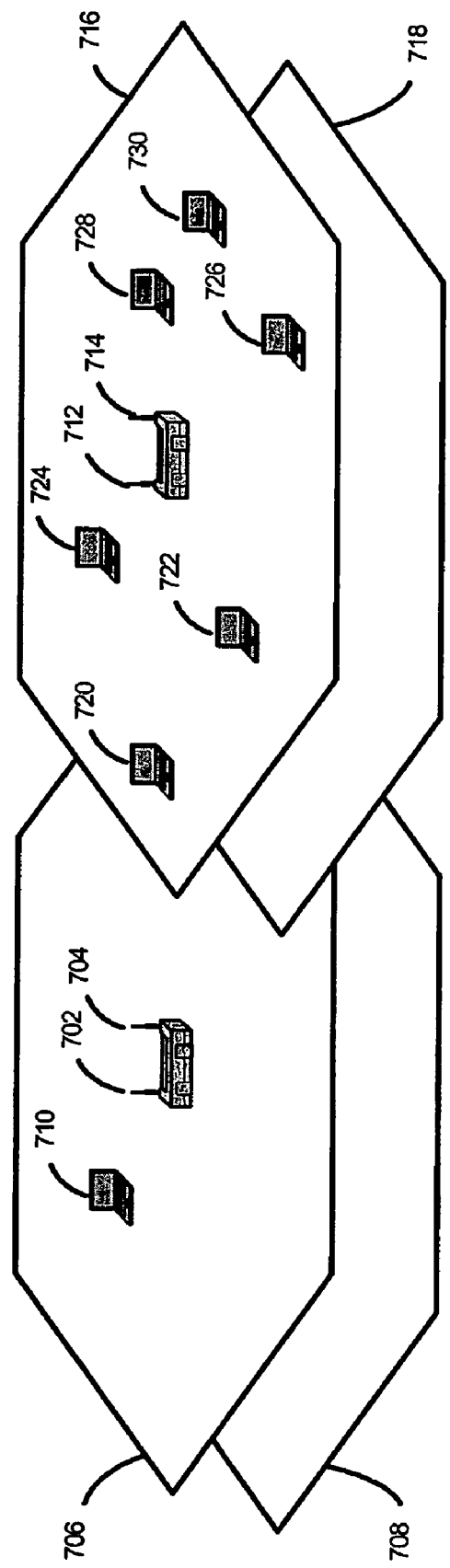
FIG. 7 shows a wireless network exhibiting uneven load. The wireless network includes AP devices 702 and 704, having cells 706 and 708, respectively.

FIG. 7 shows a wireless network exhibiting uneven load. The wireless network includes AP devices 702 and 704, having cells 706 and 708, respectively. Here, AP devices 702 and 704 are shown as being included in a common physical module. An STA device 710 is within cells 706 and 708. The wireless network shown in FIG. 7 also includes AP devices 712 and 714, having cells 716 and 718, respectively. AP devices 712 and 714 are shown as being included in a common physical module. A number of STA devices 720, 722, 724, 726, 728, and 730 are within cells 716 and 718. As shown, STA device 720 is within not only cells 716 and 718, but also cells 706 and 708.

According one embodiment of the invention, load balancing can occur amongst AP devices found in separate physical modules. In one scenario, STA device 710 is associated with AP device 702, and STA devices 720, 722, 724, 726, 728, and 730 are associated with AP device 712. Here, the network has uneven load in the sense that only one STA device is associated with AP device 702, while many more STA devices are associated with AP device 712. In the present embodiment, the association of STA device 720 may be changed to achieve better load balancing. Specifically, STA device 720 may instead associate with AP device 702, which shifts load from a more heavily loaded AP device to a less heavily loaded AP device.

According to another embodiment of the invention, load balancing can occur amongst AP devices found in the same physical module. In another scenario, STA devices 720, 722, 724, and 726 may be associated with AP device 712, and STA devices 728 and 730 may be associated with AP device 714. Here, the network has uneven load in the sense that many STA devices are associated with AP device 712, while few STA devices are associated with AP device 714. In the present embodiment, the association of STA device 726, for instance, may be changed from AP device 712 to AP device 714 to achieve better load balancing. Again, this shifts load from a more heavily loaded AP device to a less heavily loaded device.

In additional to information on the load of different AP devices, information indicating the signal strength of different AP devices may also be used in selecting an AP device with which an STA device is to associate. Generally speaking, it may be advantageous for an STA device to be associated with an AP device having a stronger signal strength, which may indicate that the AP device is closer in proximity to the STA device. Different measurements of signal strength may include an RSSI measurement, an SIR measurement, and/or others, as mentioned previously. Selection of an AP device with which an STA device is to associate may thus be based on a combination of both load and signal strength associated with each candidate AP device. Generally speaking, an AP device having a lighter load is favored in the selection. Also, an AP device having more signal strength is favored.

A. Triggers For Load Balancing

In one scenario, the STA device may be a device that has not yet associated with any AP device and is selecting an AP device with which to associate. Thus, during association of an STA device, the selection of which AP device to associate with may take into account factors such as load information and signal strength information corresponding to various AP devices.

In another scenario, the STA device may already be associated with an AP device. Here, conditions relevant to AP device selection may be periodically monitored. For example, load information and signal strength information corresponding to various AP devices available to be associated with the STA device may be monitored. When a predetermined condition is met, a new AP device may be selected based on such information. The STA device may then be disassociated from its current AP device and associated with the newly selected AP device. This may involve a hand off procedure to transfer the STA device from the current AP device to the newly selected AP device, which is known in the art. The rate at which such a predetermined condition may be periodically monitored may be set at a default value. A different default value may be set for each STA device, AP device, group of AP devices, or network. The setting of such default values may be determined based on performance considerations.

B. Load Balancing Decision by STA Device

According to one embodiment of the invention, an STA device may perform load balancing by selecting an AP device with which to associate, taking into account information such as load and signal strength of various AP devices. For example, an STA may receive load information from various AP devices in its proximity. In addition, for each AP device, the STA device may make one or more signal strength measurements associated with the AP device. The STA device may can then compare the load information and signal strength information of the available AP devices and select the best AP device with which to associate.

C. Load Balancing Decision by AP Device

According to another embodiment of the invention, an AP device may perform load balancing by selecting itself or another AP device as the AP device with which an STA is to associate. For example, an AP device may obtain its own load information and receive load information from other AP devices proximate to the STA device. In addition, the AP device may receive from the STA device signal strength measurements relating to various AP devices. The AP device may then compare the load and/or signal strength information of various AP devices and select the best AP device with which the STA device is to associate.

An illustrative algorithm is described below for balancing load between two AP devices included in a common physical module. Each AP device may implement the algorithm. The algorithm helps an AP device decide whether it should allow association of an STA, or pass the STA off to be associated with the other AP device. Here, this decision takes into account load information of the AP device carrying out the algorithm and load information of the other AP device in the module. The algorithm may refer to the two AP devices included in a common physical structure as two "AP radios." The AP device carrying out the algorithm is referred to as "the AP radio," and the other AP device is referred to as "the mate radio."

The algorithm is represented by a function named "LOAD_BALANCE," which is invoked by an AP device when a STA device attempts to associate with the AP device. The function returns TRUE if the STA device is accepted by the AP device. It returns FALSE if the STA device is not accepted by the AP device. If TRUE is returned, the STA device is associated with the AP device. If FALSE if returned, the STA device is transferred to the other AP device in the common physical structure, with a message confirming that the STA device is to be associated with the other AP device.

Here, the AP device carrying out the algorithm may be configured for one of three types of load balance schemes: client-side, AP-side, and Network-side. Specifically, a field referred to as "LOAD_BALANCE_TYPE" may be set to one of three values "CLIENT_SIDE," "AP_SIDE," and "NETWORK_SIDE." Client-side refers to a mode in which the STA device makes the load balancing decision as to which AP device it should associate with, as discussed in a previous section. AP-side refers to a mode in which an AP device makes the load balancing, as discussed in the present section. Network-side refers to a mode in which a network entity makes the load balancing decision, as discussed in a later section.

The AP device carrying out the algorithm has access to load information for each AP device included in the common physical module. The load information comprises (1) a count of number of STAs associated with the AP device and (2) a measure of channel utilization expressed as a percentage of time spent by the AP device in communicating data.

If the load balance type is client-side, the function returns TRUE to allow the STA device to associate with the present AP device. This is done because in such a mode the STA station would be selecting the appropriate AP device with which to associate, and the present AP device allows the STA device to make the association.

If an association type field indicates that the STA device has already been transferred over from the other AP device in the common physical module, the present AP device also allows the association. In this case, the other AP device likely has carried out the same algorithm and determined that the present AP device should be selected for association with the STA device. Thus, the present AP device allows the association.

If the load type is AP-side, the function returns either TRUE or FALSE depending on load information of the present AP device and the other AP device. Generally speaking, the less heavily loaded AP device is chosen for association with the STA device. Here, if the number of STA devices associated with the present AP exceed the number of STA devices associated with the other AP device by a certain value, for example "2", then the function returns FALSE. Or, if the percentage of time spent by the present AP device in communicating data exceeds the percentage of time spent by the other AP device in communicating data by a certain value, for example "10%", then the function also returns FALSE. Otherwise, the function returns TRUE. In other words, if by either measure the present AP device is more heavily loaded than the other AP device, the STA device is passed off to the other AP device for association. Otherwise, the present AP device associates with the STA device.

Finally, if the load type is network-side, the function returns TRUE to allow the STA device to associate with the present AP device. Here, a network entity may manage the manner by which load is balanced, and an algorithm such as the one described above allows that to occur.

D. Load Balancing Decision by Network Entity

In another embodiment of the invention, a central entity other than the available AP devices may perform load balancing by selecting the AP device with which an STA is to associate. The central entity may also be referred to as a network entity and may reside on a network connected to one or more AP devices. The central entity may select the appropriate AP device for association based on information collected for a large number of AP devices, taking into account load distribution across one or more wireless networks.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for establishing communications in a wireless local area network comprising:

obtaining at least one measurement of load for each of a plurality of access point (AP) devices, wherein the plurality of AP devices comprises a first AP device communicating at a first pre-selected frequency and a second AP device communicating at a second dynamically selected frequency, the first AP device remains at the preselected frequency and the second AP device can automatically dynamically change frequencies;

automatically selecting one of the plurality of AP devices as a selected AP device by taking into account the at least one measurement of load for each of the plurality of AP devices, wherein the first AP device is selected as the selected AP device when a station (STA) device to be associated with an AP device is not able to automatically dynamically change frequencies and the second AP device is selected as the selected AP device when the station (STA) device to be associated with an AP device is able to automatically dynamically change frequencies;

associating the station (STA) device with the selected AP device; and wherein the selected AP device and the STA device are capable of communicating data within a wireless local area network.

2. The method of claim 1 wherein the at least one measurement of load for each AP device comprises a count of STA devices associated with the AP device.

3. The method of claim 1 wherein the at least one measurement of load for each AP device comprises a measurement of percentage of time during which the AP device is communicating data.

4. The method of claim 1 further comprising a step of obtaining at least one measurement of signal strength as measured at the STA device for each of the plurality of AP devices, wherein the step of automatically selecting one of the plurality of AP devices further takes into account the at least one measurement of signal strength for each AP device.

5. The method of claim 4 wherein the at least one measurement of signal strength is based on a received signal strength indicator (RSSI) measurement.

6. The method of claim 4 wherein the at least one measurement of signal strength is based on a signal-to-interference ration (SIR) measurement.

7. The method of claim 1 wherein the step of automatically selecting one of the plurality of AP devices is performed by the STA device.

8. The method of claim 1 wherein the step of automatically selecting one of the plurality of AP devices is performed by one of the plurality of AP devices.

9. The method of claim 1 wherein the step of automatically selecting one of the plurality of AP devices is performed by a central entity.

10. The method of claim 1 wherein automatic selection of one of the plurality of AP devices is triggered before the STA device is associated with any of the plurality of AP devices.

11. The method of claim 1 wherein automatic selection of one of the plurality of AP devices is triggered periodically to newly select an AP device, and the STA device is associated with the newly selected AP device.

12. The method of claim 1, wherein the plurality of AP devices comprises the first AP device and the second AP device included in a common physical module; and wherein one of the first AP device and second AP device is selected as the selected AP device.

13. The method of claim 12 wherein the second AP device is selected as the selected AP device if load of the first AP device sufficiently exceeds load of the second AP device.

14. The method of claim 13 wherein load of the first AP device is deemed to sufficiently exceed load of the second AP device if a count of STA devices associated with the first AP device exceeds a count of STA devices associated with the second AP by a specified margin.

15. The method of claim 13 wherein load of the first AP device is deemed to sufficiently exceed load of the second AP device if a measurement of percentage of time during which the first AP device is communicating data exceeds a measurement of percentage of time during which the second AP device is communicating data by a specified margin.

16. The method of claim 13 wherein load of the first AP device is deemed to sufficiently exceed load of the second AP device if:

a count of STA devices associated with the first AP device exceeds a count of STA devices associated with the second AP by a specified margin, or a measurement of percentage of time during which the first AP device is communicating data exceeds a measurement of percentage of time during which the second AP device is communicating data by a specified margin.

17. A system for establishing communications in a wireless local area network comprising:

a plurality of access point (AP) devices configured to allow at least one measurement of load to be obtained for each of a plurality of AP devices, wherein the plurality of AP devices comprises a first AP device communicating at a first pre-selected frequency and a second AP device communicating at a second dynamically selected frequency, the first AP device remains at the preselected frequency and the second AP device can automatically dynamically change frequencies by taking into account the at least one measurement of load for each of the plurality of AP devices, wherein one of the plurality of AP devices is allowed to be selected as a selected AP device to be associated with a station (STA) device to be associated with an AP device, the first AP device is selected as the selected AP device when the station (STA) device is not able to automatically dynamically change frequencies and the second AP device is selected as the selected AP device when the station (STA) device is able to automatically dynamically change frequencies;

the station (STA) device is associated with the selected AP device; and wherein the selected AP device and the STA device are capable of communicating data within a wireless local area network.

18. The system of claim 17 wherein automatic selection of one of the plurality of AP devices is performed by the STA device.

19. The system of claim 17 wherein the automatic selection of one of the plurality of AP devices is performed by one of the plurality of AP devices.

20. The system of claim 17 further comprising a central entity, wherein automatic selection of one of the plurality of AP devices is performed by the central entity.

21. The system of claim 17, wherein the plurality of AP devices comprises the first AP device included in a first physical module and the second AP device included in a second physical module; and wherein one of the first AP device and second AP device is selected as the selected AP device.

22. The system of claim 17, wherein the plurality of AP devices comprises the first AP device and the second AP device included in a common physical module; and wherein one of the first AP device and second AP device is selected as the selected AP device.

23. A system for establishing communications in a wireless local area network comprising:

means for obtaining at least one measurement of load for each of a plurality of access point (AP) devices, wherein the plurality of AP devices comprises a first AP device communicating at a first pre-selected frequency and the first AP device remains at the preselected frequency;

means for automatically selecting one of the plurality of AP devices as a selected AP device by taking into account the at least one measurement of load for each of the plurality of AP devices, wherein the first AP device is selected as the selected AP device when a station (STA) device to be associated with an AP device is not able to automatically dynamically change frequencies, and wherein another AP device of the plurality of AP devices is selected as the selected AP device based upon the at least one measurement of load for each of the plurality of AP devices when the station (STA) device to be associated with an AP device is able to automatically dynamically change frequencies;

means for associating a station (STA) device with the selected AP device; and wherein the selected AP device and the STA device are capable of communicating data within a wireless local area network.

* * * * *

UNITED STATES PATENT AND TRADEMARK OFFICE
CERTIFICATE OF CORRECTION

PATENT NO.       : 7,573,857 B1                                                          Page 1 of 1
APPLICATION NO. : 11/036973
DATED            : August 11, 2009
INVENTOR(S)      : Radhakrishnan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Seventh Day of September, 2010

David J. Kappos
*Director of the United States Patent and Trademark Office*